(12) United States Patent
Duart Alvarez De Cienfuegos (10) Patent No.: US 11,666,984 B2
(45) Date of Patent: Jun. 6, 2023

(54) EXOTHERMIC WELDING WITH NON-COMMUNICATED CAVITIES

(71) Applicant: KLK ELECTRO MATERIALES, S.L.U., Gijon (ES)

(72) Inventor: Daniel Duart Alvarez De Cienfuegos, Gijon (ES)

(73) Assignee: KLK ELECTROC MATERIALES, S.L.U., Gijon (ES)

( * ) Notice: Subject to any disclaimer, the term of this patent is extended or adjusted under 35 U.S.C. 154(b) by 158 days.

(21) Appl. No.: 17/048,419

(22) PCT Filed: Apr. 18, 2018

(86) PCT No.: PCT/ES2018/070309
§ 371 (c)(1),
(2) Date: Oct. 16, 2020

(87) PCT Pub. No.: WO2019/202177
PCT Pub. Date: Oct. 24, 2019

(65) Prior Publication Data
US 2021/0162533 A1 Jun. 3, 2021

(51) Int. Cl.
*B23K 23/00* (2006.01)
*B23K 37/04* (2006.01)
*B23K 37/06* (2006.01)
*B23K 103/10* (2006.01)

(52) U.S. Cl.
CPC .......... *B23K 23/00* (2013.01); *B23K 37/0426* (2013.01); *B23K 37/06* (2013.01); *B23K 2103/10* (2018.08)

(58) Field of Classification Search
CPC .................................. B23K 23/00; B23K 37/06
USPC ........................................................ 228/248.1
See application file for complete search history.

(56) References Cited

U.S. PATENT DOCUMENTS

| | | | | |
|---|---|---|---|---|
| 1,732,382 A | * | 10/1929 | Schultz | B23K 23/00 164/DIG. 12 |
| 1,747,419 A | | 2/1930 | Hughes | |
| 1,838,357 A | * | 12/1931 | Bottrill | B23K 1/008 228/234.3 |
| 2,977,651 A | * | 4/1961 | Boutet | B23K 23/00 164/105 |

(Continued)

FOREIGN PATENT DOCUMENTS

| | | | | |
|---|---|---|---|---|
| DE | 19819706 C1 | * | 10/1999 | ............. B23K 23/00 |
| EP | 3202522 A1 | | 8/2017 | |

*Primary Examiner* — Erin B Saad
*Assistant Examiner* — Carlos J Gamino
(74) *Attorney, Agent, or Firm* — Hayes Soloway PC (57) ABSTRACT

A mold includes a weld cavity, housings for the components to be welded, a crucible-funnel in communication with the weld cavity for housing filling material, at least one additional cavity for housing an exothermic mixture; and an inner shell that separates the crucible-funnel and the at least one additional cavity to transmit heat produced in the exothermic reaction from the additional cavity to the crucible-funnel. The mold allows the exothermic mixture to be isolated to avoid contact with the filling material and to prevent the filling material from reaching the weld cavity. The system can further include a first filler and a second filler, arranged to be mounted over the mold for introducing the filling material and the exothermic mixture, respectively.

18 Claims, 4 Drawing Sheets

(56) References Cited

U.S. PATENT DOCUMENTS

| | | | | |
|---|---|---|---|---|
| 3,495,801 A | * | 2/1970 | Kruger | B23K 23/00 |
| | | | | 249/141 |
| 3,860,062 A | * | 1/1975 | McMurray | B23K 37/06 |
| | | | | 164/334 |
| 2003/0178168 A1 | * | 9/2003 | Triantopoulos | B23K 23/00 |
| | | | | 249/86 |
| 2007/0272114 A1 | * | 11/2007 | Delcroix | B22C 9/02 |
| | | | | 104/2 |
| 2011/0132967 A1 | | 6/2011 | Lofton et al. | |

* cited by examiner

EXOTHERMIC WELDING WITH NON-COMMUNICATED CAVITIES

CROSS-REFERENCE TO RELATED APPLICATIONS AND PRIORITY

This patent application claims priority from PCT Patent Application No. PCT/ES2018/070309 filed Apr. 18, 2018. This patent application is herein incorporated by reference in its entirety.

OBJECT OF THE INVENTION

The present invention can be included in the sector of welding, in particular, the sector of aluminothermic welding. More specifically, the object of the invention relates to an exothermic welding system and method which enables the welding of aluminum pieces or conductors, as well as many other types.

BACKGROUND OF THE INVENTION

Welding is a joining procedure by which two or more components (generally metal) are joined through the application of heat and, depending on the case, a filling material (welding with a filling material). The heat melts the components in the joining area causing them to mix and, this way, once they are cooled, a joint with a continuous variation in the properties of the components is generated, both inside and outside the joining area.

In the case of welding with a filling material, part of the heat applied is used to melt a filling material, and optionally, another part is used to melt the components in the joining zone. In this way, the filling material, once melted, is deposited in the joining area in order to form part of said joint.

A welding method with filling material is called exothermic welding, by means of which the heat applied comes from an exothermic reaction between various reagents that make up an exothermic mixture. By activating the reaction of the exothermic mixture (for example, by applying a spark), the reaction is produced, which in addition to a large amount of heat, generates the filling metal in liquid state, which is filtered and poured on the joining area, melting the components and forming a welded joint.

A particular type of exothermic welding consists of aluminothermic welding, in which the exothermic mixture comprises a metal reducing agent (generally aluminum), a metal oxide and, occasionally, a flux to eliminate oxide previously deposited on the components, especially if they are aluminum. The exothermic reaction consists of the metal reducing agent reducing the metal oxide, generating oxide of the metal reducing agent (aluminum), called slag, and the melted metal, which accesses the joining zone and serves as a filling material. During the reaction, the slag is separated from the melted metal due to the difference in the density thereof, and therefore does not access the joining zone, and can be collected and/or separated later. The exothermic reaction is not produced when the exothermic mixture comprises aluminum and aluminum oxide.

For exothermic welding, in particular an aluminothermic welding, molds which house both the components to be welded and the exothermic mixture are used and, when applicable, flux is also used, and they are configured to direct the melted metal towards the joining zone.

In particular, said molds comprise one or several parts in which one or several housings are defined, located at the bottom, to house the respective components to be welded, wherein the housings converge inside in a weld zone.

Furthermore, the mold comprises a crucible-funnel on the upper part thereof, which comprises an upper opening for introducing the exothermic mixture, and a lower opening, which is to be blocked, by means of a disc, before introducing the exothermic mixture. Once the exothermic mixture is introduced, the upper opening of the crucible-funnel is covered by a lid, which generally includes a hole for introducing an activator which generates a spark and activates the exothermic reaction. Instead of using an external activator which is insertable through the hole, it is possible to insert a remote-controlled fuse type activator.

A pouring channel communicates the lower opening of the crucible-funnel with the weld zone. Once the exothermic reaction is activated, the melted filling material produced melts the disc and accesses the weld zone through a pouring channel.

The use of aluminothermic welding, in particular with the previously described molds, implies a series of conditioning factors in relation with the nature of the components to be welded and the exothermic mixture (metal reducing agent and oxide of the filling metal). A typical example is that of welding ferrous components (such as sections of railway track), using aluminum and iron oxide in the exothermic mixture. For welding non-ferrous materials, other aluminothermic welding methods are useful. However, all of them have significant limitations when dealing with welding aluminum pieces, as will be explained below.

A first example relates to an exothermic mixture that comprises aluminum and copper oxide, in which melted copper is generated as a filling metal, which is useful for welding copper components, as well as for when both components are different materials, such as copper and steel, for example. However, it is not useful when one of the components is aluminum, given that a copper-aluminum alloy would be produced with a high proportion of copper and aluminum, which, as is known, is extremely fragile, to the point where a small blow is enough to break it.

A second example relates to an exothermic mixture that comprises aluminum and tin oxide. This type of welding can be applied when the conductors are aluminum, using a proper flux for this type of welding. However, it is problematic due to the potential difference between the base material (aluminum) and the filling material (tin), which results in poor stability of the joint with regard to corrosion, highly limiting the possible applications thereof. Additionally, there is a problem of low heat concentration that is achieved through this method in the weld zone, which makes it necessary to use a large part of the filling metal in preheating the pieces to be joined, this first metal being housed in an auxiliary cavity, below the welding zone, resulting in an excess of necessary metal (tin, highly expensive).

According to a third example, a variant is introduced, according to which the exothermic mixture comprises aluminum, without a metal oxide, but rather with calcium sulphate, wherein the aluminum is present in excess with respect to the stoichiometric proportion, by which, apart from slag, calcium sulfide and melted aluminum are also produced, the melted aluminum being the filling material. In theory, this type of welding can be applied when the conductors are aluminum, using a proper flux for this type of welding. However, this method also has the drawback, among others, of a low heat concentration achieved in the weld zone.

DESCRIPTION OF THE INVENTION

The present invention provides an exothermic welding system and method, wherein the exothermic welding method is with an addition of filling metal and with the exothermic mixture as a heat source, such that the exothermic mixture is isolated with respect to the filling material and the weld cavity, which allows the filling metal to be used more conveniently in each case, which, along with the freedom of the geometric design of the joint, allows welding with an unbeatable quality to be easily and immediately achieved. It is worth mentioning that a first application, yet not the only application, is the welding of aluminum pieces and conductors, for which there is currently no clear aluminothermic welding solution.

To do so, the system comprises a mold that is characterized in that, in addition to housings for the pieces to be welded, a weld cavity wherein the housings converge, and a crucible-funnel communicated with the weld cavity for housing the filling material, it also includes:

- at least one additional cavity that surrounds the crucible-funnel, and preferably, also the housings for the components to be welded and the weld cavity; and
- an inner shell that separates the additional cavity or cavities with respect to the crucible-funnel, to the housings for the components to be welded and to the weld cavity.

The additional cavities are provided to house, in a first stage, an exothermic mixture, and, in a second stage, after the reaction of said mixture has taken place, the products of said reaction. From the moment at which the exothermic reaction is initiated, a heat flow is created from the additional cavities, passing through the inner shell, and to the crucible-funnel, the housings for the components to be welded, and the weld cavity. The heat flow allows the temperature of the components to be welded to rise, as well as that of the filling metal, causing the melting of at least the filling metal and ultimately allowing the welding to take place.

This configuration allows for the welding of aluminum components using aluminum as a filling metal, meaning with filling metal of the same nature as that of the base metal, with all the advantages this provides.

The method comprises a first step of arranging the mounted mold, with the components housed in the housings and the ends of the components within the weld cavity.

The filling material is subsequently poured through the crucible-funnel, in the weld cavity and in the crucible-funnel itself, and the exothermic mixture is also poured in the additional cavity or cavities.

The exothermic reaction is then activated, generating heat that is transmitted towards the crucible-funnel and towards the components to be welded, by which the temperature of the components to be welded and the filling metal rises, causing the melting of at least the filling material, which is poured and occupies the weld cavity and carries out the welding.

DESCRIPTION OF THE DRAWINGS

As a complement to the description provided herein and for the purpose of helping to make the characteristics of the invention more readily understandable, in accordance with a preferred practical embodiment thereof, said description is accompanied by a set of drawings constituting an integral part of the same, which by way of illustration and not limitation represent the following.

PREFERRED EMBODIMENT OF THE INVENTION

What is offered below, with the help of the aforementioned FIGS. 1-9, is a detailed description of a preferred exemplary embodiment of an exothermic welding system, in accordance with the present invention.

The system of the invention allows exothermic welding to be carried out, in particular alumunothermic welding, in which components (1) are welded, wherein some of the components (1) can comprise aluminum or an aluminum alloy, using an exothermic mixture (2) and solid filling material (3), together with a flux product (not shown) if needed, without the drawbacks that exist in the state of the art.

The system comprises a mold (6), which in turn comprises a weld cavity (4) for receiving the melted filling material (3), which is produced by melting the solid filling material (3), as a result of the heat generated in an exothermic reaction.

The mold (6) additionally incorporates corresponding housings (5) for inserting the components (1) to be welded, wherein the housings (5) converge in the weld cavity (4). There are generally two housings (5), but there could be more, if a greater number of components (1) need to be joined by means of welding.

In the upper part of the mold (6) there is a crucible-funnel (7), which comprises an upper opening (8), communicated with the outside of the mold (6) and a lower opening (9), communicated with the upper part of the weld cavity (4). Preferably, the lower opening (9) of the crucible-funnel (7) superiorly opens into the weld cavity (4). The crucible-funnel (7) is intended to receive a solid, preferably granular mixture through the upper opening (8), comprising solid filling material (3), along with, if applicable, the flux product.

The invention is characterized in that it further includes at least one additional cavity (10), preferably several additional cavities (10), in particular two additional cavities (10). The additional cavities (10) surround the outside of the weld cavity (4), and at least one part further below the crucible-funnel (7), as well as they are intended to house the exothermic mixture (2).

The additional cavity or cavities (10) are separated from the crucible-funnel (7) and, if applicable, from the weld cavity (4) by means of at least one inner shell (11) of a reduced thickness and highly heat-conductive material, such as graphite, to allow for a quick transmission of heat from the additional cavities (10) towards the crucible-funnel (7), and if applicable, the weld cavity (4) and the housings (5).

Lastly, an outer body (12) surrounds the outside of the additional cavity or cavities (10). The outer body (12) is made of a poor heat-conductive material, and preferably of a thickness that is substantially greater than the inner shell (11) in order to favor a transmission of heat towards the inside, in other words, from the additional cavities (10) towards the crucible-funnel (7), and, if applicable, to the weld cavity (4) and the housings (5).

As previously indicated, by means of the system described, an exothermic welding is enabled without contact being made between the exothermic mixture (2) and the filling material (3). This way, the filling material (3) can be selected from materials that are most ideal for the type of welding in question, based on the nature of the components (1) to be welded, and on the working conditions of the welded components (1), while the exothermic mixture (2) can be selected independently, avoiding the drawbacks of the products of the exothermic reaction coming into contact with the filling material (3).

This way it is possible, for example, to weld aluminum components (1) using aluminum as a filling material (3), thereby obtaining an ideal performance, with regard to corrosion, of the welded joint. Likewise, there is no drawback in the exothermic mixture (2) being the type that generates copper, given that since the mixture with the filling metal (3) for example, aluminum, does not exist, the problems of fragility are avoided. Additionally, it is no longer necessary to decant the products of the exothermic reaction, and thus the exothermic mixture (2) can be in contact with the inner shell (11) before the exothermic reaction is produced, thereby taking maximum advantage of the heat generated.

To carry out the exothermic welding using the system of the invention, we begin with an initial position in which the mold (6) is mounted and the components (1) to be welded are housed in the respective housings (5) thereof with the ends of the components (1) inside the weld cavity (4).

Figure 1:
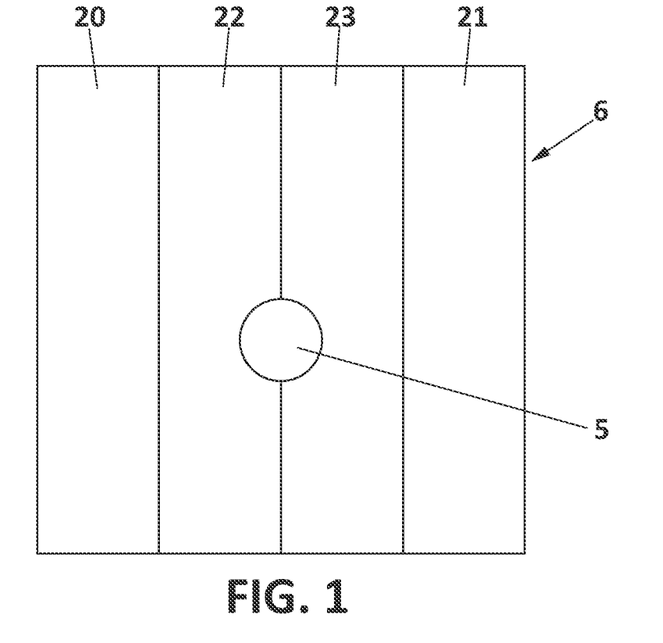
FIG. 1 shows an elevation view of the mold of the invention.
Figure 2:
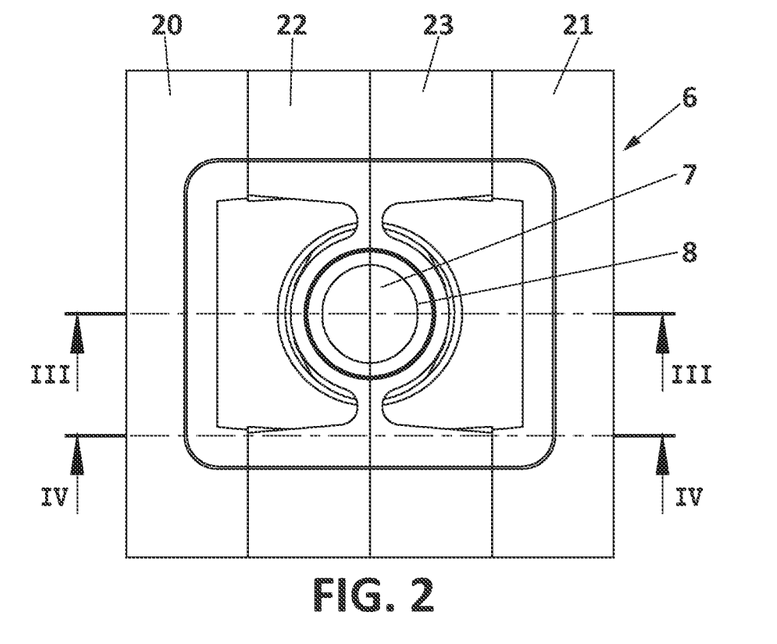
FIG. 2 shows a plan view of the mold of FIG. 1.
Figure 3:
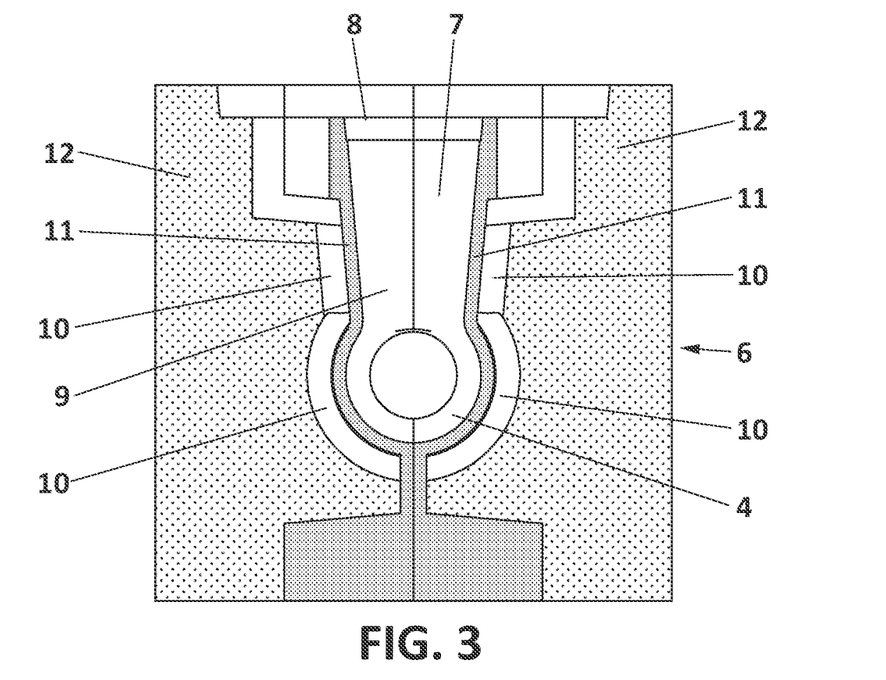
FIG. 3 shows a cross-sectional view through plane III-III of FIG. 2.
Figure 4:
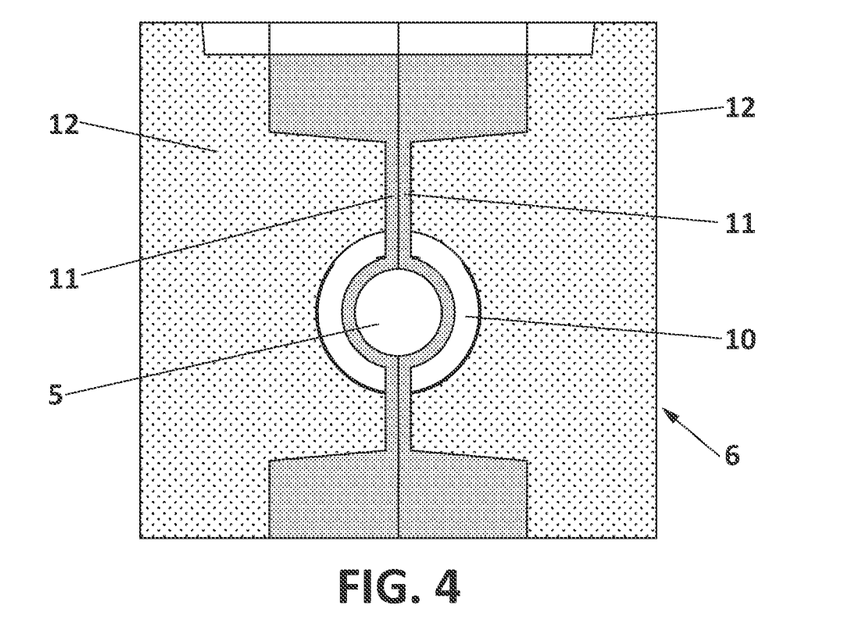
FIG. 4 shows a cross-sectional view through plane IV-IV of FIG. 2.
Figure 5:
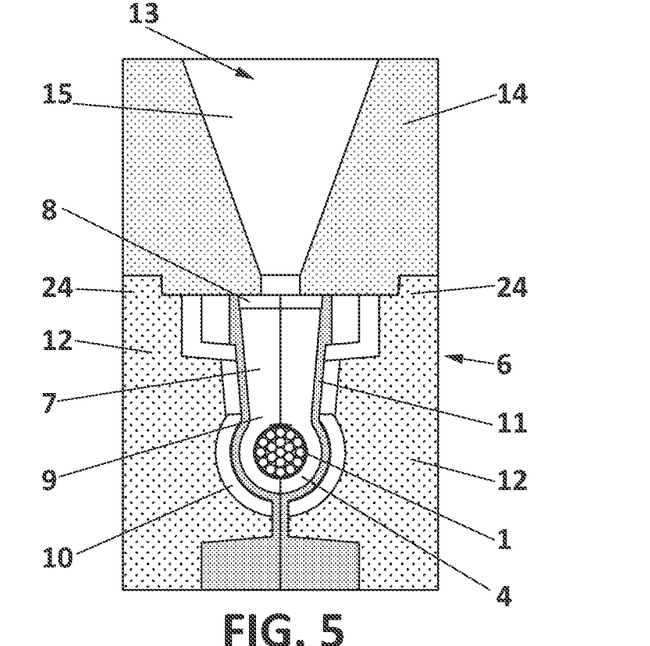
FIG. 5 shows the use of a first filler for pouring the filling material.

The filling material (3) and the exothermic mixture (2) are then provided. For example, firstly, the filling material (3) is poured through the upper opening (8) of the crucible-funnel (7) such that the filling material (3) is housed in the weld cavity (4) and in the crucible-funnel (7) itself. To pour the filling material (3) one can use a first filler (13) mounted on the upper part of the mold (6), which is mounted on top of the mold (6) and which comprises a first body (14) with a first hollow (15) in the form of a funnel which empties into the crucible-funnel (7). Preferably, the first body (14) is configured to cover the additional cavities (10) when it is mounted on the upper part of the mold (6).

Figure 6:
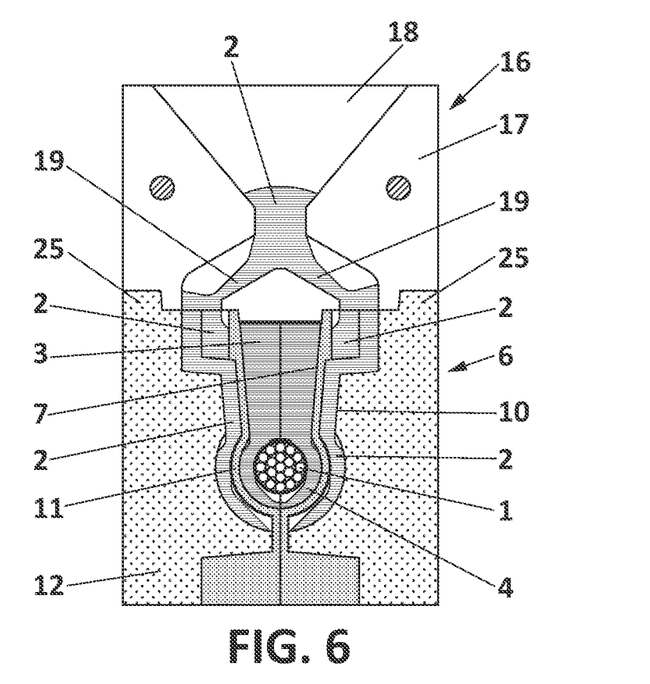
FIG. 6 shows the use of a second filler for pouring the exothermic mixture.

The exothermic mixture (2) is then poured inside the additional cavities (10). To do so, a second filler (16) can be used, which comprises a second body (17) with a second hollow (18) in the form of a funnel and bifurcations (19) which communicate with the additional cavities (10). Preferably, the second body (17) is configured to cover the crucible-funnel (7) when it is mounted on the upper part of the mold (6).

The filling material (3) can be placed in the mold (6) either before or after the exothermic mixture (2).

Once the filling material (3) and the exothermic mixture (2) are placed, the exothermic mixture (2) is activated to produce the exothermic reaction, which generates heat which is transmitted to the crucible-funnel (7) through the inner shell (11) to melt the filling material (3), which is poured, and is housed in the weld cavity (4), generating a welded joint.

The exothermic reaction also results in products of the reaction (not shown), which remain in the additional cavities.

The heat emitted in the exothermic reaction is not only transmitted to the crucible-funnel (7) to cause the melting of the filling metal (3), but also to the housings (5) and the weld cavity (4). This way, on the one hand, the components (1) to be welded are heated to raise their temperature to the predetermined welding temperature, and on the other hand, the heat is concentrated in the weld cavity (4), wherein the filling material (3) must remain in a liquid state and with a high degree of fluidity to fill said weld cavity (4) and completely soak the components (1) to be welded.

Lastly, the mold is opened (6) and the welded components (1) are extracted, after, if applicable, a waiting period in order to allow them to cool. The welded joint may then be finished, either by eliminating extra material, polishing, etc.

Figure 7:
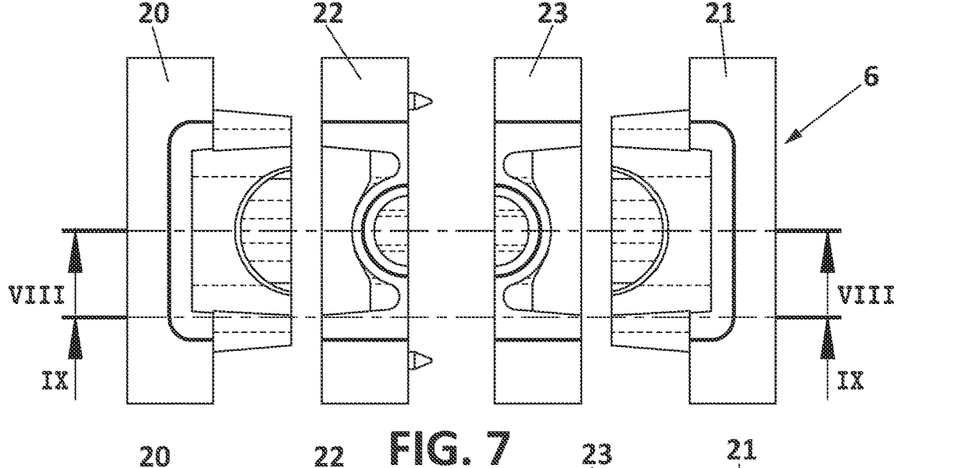
FIG. 7 shows a plan view of a mold formed by several pieces according to a preferred embodiment.
Figure 8:
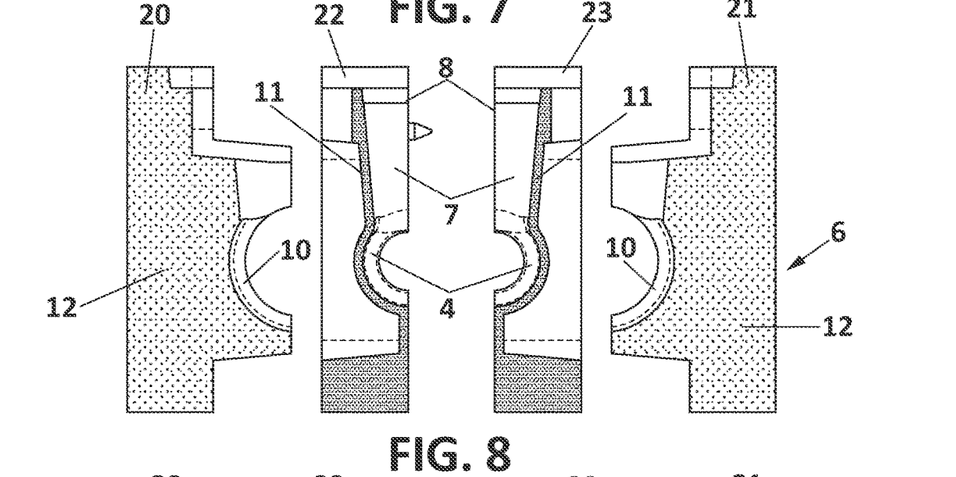
FIG. 8 shows a cross-sectional view through plane VIII-VIII of FIG. 7.
Figure 9:
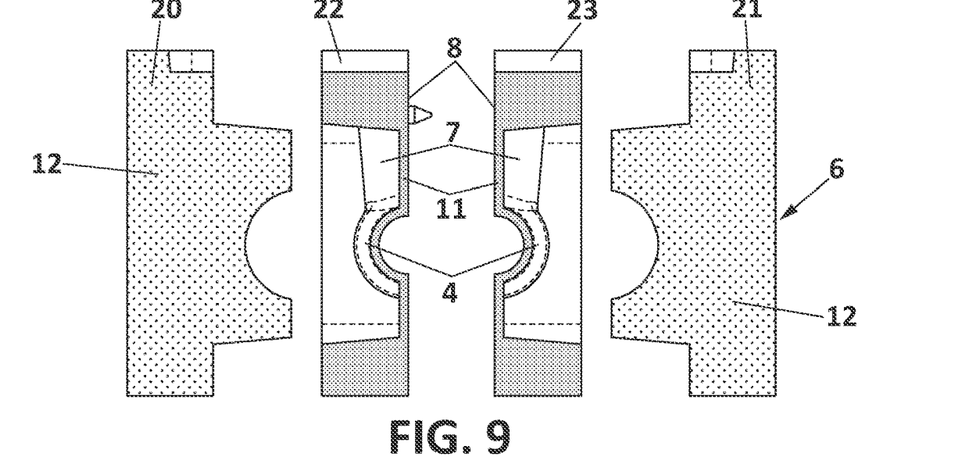
FIG. 9 shows a cross-sectional view through plane IX-IX of FIG. 7.

The mold (6) can be made up of several pieces (20, 21, 22, 23), which when assembled form the different parts of the mold (6), in other words, the housings (5), the weld cavity (4), the crucible-funnel (7) and the additional cavities (10), such that the additional cavities (10) are perfectly separated from the crucible-funnel (7) and from the weld cavity (4), and thus there is no possibility of the filling material (3) coming into contact with either the exothermic mixture (2) or with the products of the exothermic reaction.

Thus, a first group (22, 23) of pieces (20, 21, 22, 23) which incorporates the mold (6) includes those which delimit the housings (5), the weld cavity (4) and the crucible-funnel (7), and which, therefore, include the inner shell (11), which has a small thickness and is made of a good heat conductive material, preferably graphite.

A second group (20, 21) of the pieces (20, 21, 22, 23) which incorporate the mold (6) include those which make up the outer part of the mold (6) and which, on the opposite part of the inner shell (11), delimit the additional cavities (10). The second group (20, 21), as previously stated, is made of a poor heat-conductive material, preferably silica sand.

The first group (22, 23) can be made up of two pieces separated by the median plane of the housings (5) such that the two pieces can be separated to facilitate the introduction of the components (1) to be welded in the housings (5), and to leave the welded joint in sight once it is made.

As was previously stated, the crucible-funnel (7) is envisaged to receive the filling material (3) in a solid state, optionally in a granular form, depending on the size of the upper opening (8) of the crucible-funnel (7), with the help of the first filler (13). Both the first filler (13) and the mold (6) can have first protrusions (24) to ensure a correct positioning. It is worth mentioning that once the first filler (13) is correctly positioned on the mold (6) it is not possible to pour the filling material (3) inside the additional cavities (10), the only possibility being to pour it into the inside of the crucible-funnel (7).

Furthermore, and as was previously stated, the additional cavities (10) comprised by the mold (6) are provided to receive the exothermic mixture (2), preferably in a granular form, for example, with the help of the second filler (16), the bottom of which branches into as many bifurcations (19) as there are differentiated additional cavities (10) incorporated by the mold (6), such that each channel ends in a hole small enough to receive the exothermic mixture (2) through the upper opening of corresponding additional cavity (10).

The second filler (16) with bifurcations (19) is provided to be placed on the mold (6) such that the final hole of each bifurcation (19) coincides with the upper opening of the corresponding additional cavity (10). Both the second filler (16) and the mold (6) can have second protrusions (25) to ensure that the first is correctly positioned with respect to the second. It is worth mentioning that once the second filler (16) is correctly placed on the mold (6) it is not possible to pour the exothermic mixture (2) into the inside of the crucible-funnel (7), the only possibility being to pour it into the inside of the additional cavities (10).

It is worth mentioning that if the filling metal (3) is in a granular form, the apparent density thereof will be much less than that of the filling metal (3) once it has been melted, and thus the volume of the crucible-funnel (7) will have to be much greater than the volume to be filled in the weld cavity (4) by said melted filling metal (3).

In the same way, if the exothermic mixture (19) is in a granular form, the apparent density thereof will be much less than that of the products of the reaction in liquid state, and thus the volume of the additional cavities (10) may not be sufficient to contain the total exothermic mixture (2), and therefore the same will tend to overflow at the top, occupying the bifurcations (19), and even the bottom of the second filler (16). It is in this higher part of the exothermic mixture (2) where the reaction can be easily initiated, which will propagate towards the entire mass of the exothermic mixture (2).

Given that the ignition of the exothermic mixture (2) is done at the bottom of the second filler (16), the same is preferably a refractory material, and furthermore can incorporate a lid (not shown), to prevent projections from coming out, or to house a fuse (not shown) to remotely carry out the activation.

In addition to the filling material (3), the object of the invention can make use of a flux. Both the filling metal (3) as well as the flux can be conventional and conveniently selected for carrying out the welding in question.

For example, if we are dealing with welding aluminum pieces or conductors, the filling material (3) can be an alloy with an eutectic composition made up of 88% aluminum and 12% silicon (AlSi12), and the flux can be potassium aluminum fluoride. Both can be in a granular form and made up of a mixture of, for example, 75% aluminum alloy and 25% fluoride. In this case, not only the filling material (3) is poured into the inside of the crucible-funnel (7), but also the mixture of filling metal (3) and the flux.

The exothermic mixture (2) of which the object of the invention makes use can consist of different types, including, for example, that which is formed by a mixture of copper oxide and aluminum oxide, or which is made up of a mixture of iron oxide and aluminum, or even a combination of different types.

Below are some considerations with regard to materials that can be used in manufacturing the inner shell (11) and the outer body (12).

For the case of the inner shell (11), a refractory material is required, since it must withstand extremely high temperatures reached in the aluminothermic reaction. Likewise, it should be an excellent heat conductor to enhance the heat flow by conduction through the same. Furthermore, it would be desirable if it did not adhere to the melted filling material (3). Lastly, it is desirable that the thickness be reduced, to reduce the temperature drop through the same as much as possible. As a result, a highly appropriate material for the inner shell (11) is graphite. Graphene is also a material that is notably suitable, since, besides having the aforementioned characteristics, even to a greater degree than graphite, it can be extended, forming a single layer of atoms (two-dimensional material). In the case of graphite, the inner shell (11) could be obtained by means of machining or molding, even by means of additive manufacturing using 3D printers. Likewise, and preferably, the inner shell, especially when manufactured in graphite, comprises a first part with a reduced thickness, to facilitate the exothermic welding process, and a second part in the form of a rigid frame surrounding the first part, to provide greater mechanical resistance and rigidity.

With regard to the outer body (12), a refractory material is desired, to be able to withstand extremely high temperatures reached in the aluminothermic reaction. Likewise, as was previously indicated, it is desirable that the same be a poor heat conductor so that the heat flow does not pass through the same, but rather in the opposite direction, towards the inner shell (11). Due to all of the aforementioned points, it is preferable that the outer body (12) be made of sand, or even ceramic materials. The outer body (12) is preferably obtained by molding.

The invention claimed is:

1. An exothermic welding system comprising a mold to produce an exothermic weld, the mold comprising:
    two housings for housing components to be welded; and
    a weld cavity into which the housings open;
    a crucible-funnel which comprises:
        a lower opening in communication with an upper part of the weld cavity; and
        an upper opening for receiving a solid filling material in the crucible-funnel and in the weld cavity;
    additional cavities that surround the weld cavity, and which are intended to house an exothermic mixture, wherein the additional cavities are not communicated with the weld cavity; and
    an inner shell which separates the additional cavities from the crucible-funnel and from the weld cavity and delimits the housings, the weld cavity and the crucible-funnel, to allow for the transmission of heat from the additional cavities to the crucible-funnel and the weld cavity.

2. The system of claim 1, wherein the mold additionally comprises an outer body which surrounds the additional cavities.

3. The system of claim 2, wherein the outer body is made of a poor heat-conductive material, in order to favor a transmission of heat from the additional cavities towards the crucible-funnel and the weld cavity through the inner shell.

4. The system of claim 2, wherein the outer body has a substantially greater thickness than the inner shell.

5. The system of claim 2, wherein the outer body comprises at least one of sand and ceramic material.

6. The system of claim 1, wherein the lower opening of the crucible-funnel opens directly into the upper opening of the weld cavity.

7. The system of claim 1, wherein the mold comprises a plurality of pieces, the plurality of pieces comprising:
    a first group of pieces, which form the housings, the weld cavity, the crucible-funnel, and the inner shell, and
    a second group of pieces, which forms the outer body and the additional cavities.

8. The system of claim 7, wherein the first group of pieces comprises two pieces separated by a median plane of the housings thereby facilitating the introduction of the components to be welded in the housings, and to leave a welded joint in sight once it is made.

9. The system of claim 1, wherein the additional cavities additionally surround a lower part of the crucible-funnel.

10. The system of claim 1 further comprising a first filler, intended to be mounted on top of the mold, and the first filler comprising a first body in which a first hollow in the form of a funnel is defined the first hollow in communication with the crucible-funnel for pouring the filling material into the crucible-funnel and into the weld cavity.

11. The system of claim 10 further comprising a second filler mounted on top of the mold, and the second filler comprising a second body wherein a second hollow is defined in a funnel form with bifurcations that communicate with the additional cavities, for pouring the exothermic mixture into the additional cavities.

12. The system of claim 1, wherein the inner shell comprises graphite or graphene.

13. An exothermic welding method with the addition of a filling metal and with exothermic mixture as a heat source, which uses an exothermic welding system comprising a mold to produce an exothermic weld, the mold comprising:
   two housings for housing components to be welded; and
   a weld cavity into which the housings open;
   a crucible-funnel which comprises:
      a lower opening in communication with an upper part of the weld cavity; and
      an upper opening for receiving a solid filling material in the crucible-funnel and in the weld cavity;
   additional cavities that surround the weld cavity, and which intended to house an exothermic mixture, wherein the additional cavities are not communicated with the weld cavity; and
   an inner shell which separates the additional cavities from the crucible-funnel and from the weld cavity and delimits the housings, the weld cavity and the crucible-funnel, to allow for the transmission of heat from the additional cavities to the crucible-funnel and the weld cavity, wherein the method comprises the following steps:
      arranging the mold with the components to be welded arranged in the respective housings and with ends of the components inside the weld cavity;
      pouring the filling material through the upper opening of the crucible-funnel such that the filling material is housed in the weld cavity and in the crucible-funnel;
      placing the exothermic mixture inside the additional cavities;
      producing an exothermic reaction in order to generate heat which is transmitted from the additional cavities to the crucible-funnel through the inner shell to melt the filling material, which is housed, in the weld cavity, generating the exothermic weld.

14. The method of claim 13, wherein in the step for pouring the filling material, a first filler comprising a first body in which a first hollow is defined in the form of a funnel which communicates with the crucible-funnel, is mounted on top of the mold.

15. The method of claim 14, wherein when the first filler is mounted on the top of the mold, the first filler covers the additional cavities.

16. The method of claim 13, wherein in the step of placing the exothermic mixture, a second filler comprising a second body in which a second hollow is defined in a funnel form with bifurcations in communication with the additional cavities, is mounted on top of the mold.

17. The method of claim 16, wherein when the second filler is mounted on the top of the mold, the second filler covers the upper opening of the crucible-funnel.

18. The method of claim 13 further comprising a step of transmitting the heat produced in the exothermic reaction to the housings and the weld cavity.

* * * * *